United States Patent Office 2,807,562
Patented Sept. 24, 1957

2,807,562

WELDING COMPOSITION FOR HARD FACING

Arthur E. Shrubsall, Niagara Falls, N. Y., assignor to Union Carbide Corporation, a corporation of New York No Drawing. Application March 27, 1956,
Serial No. 574,108

2 Claims. (Cl. 148—26)

This invention relates to electric welding processes of the type commonly referred to as "submerged-melt," and has particular reference to a composition for use in such a process for the production of a hard facing on a metal workpiece.

In welding processes of the type referred to and described in detail in U. S. Patent No. 2,043,960, metal is deposited from a bare electrode under a deep blanket of unfused granular welding composition in a welding zone in which the welding composition is fused. The process has been widely accepted by industry where its advantages in speed, excellence of welding and mechanization have been appreciated for many years. Although originally primarily intended for the joining of steel workpieces, the process has found more and more widespread application. Among the applications to which the process has been directed are hard facing procedures in which a surface layer of a hard metal is deposited onto a metal body.

Although considerable success has been achieved in hard facing by the process described, some disadvantage is encountered in that as practised heretofore, it has been necessary to utilize welding rods of special composition to achieve desired properties in the deposit produced. A great variety of welding rods of different composition is available, but this in itself is a disadvantage for the rods are relatively expensive and it is desirable to utilize as little alloy as possible to save expense. Consequently, a shop engaged in hard facing by the process referred to must maintain a large stock of welding electrodes of different composition.

It is the principal object of this invention to provide welding compositions which, when used in conjunction with ordinary carbon steel electrodes, will produce a deposit of desired hardness upon the metal workpiece. Another object of the invention is the provision of a welding composition capable of modification to suit varying needs insofar as hardness of deposited metal is concerned.

These objects are achieved by the invention which comprises a comminuted welding composition which contains varying proportions of ferrochromium and ferromanganese in admixture with slag-forming materials. More specifically, the welding composition of the invention contains about 8% to 12% ferrochromium, 2% to 4% ferromanganese, the remainder slag-forming constituents comprising oxides of silicon, magnesium and aluminum. The mixture may, and preferably does, contain fluorspar in a proportion up to about 8% most desirably, at least 6% being present.

A typical composition according to the invention will contain 8% to 12% ferrochromium (60% to 72% chromium), 2% to 4% ferromanganese (75% to 85% manganese), 6 to 8% fluorspar, the remainder (78% to 82%) slag-forming constituent containing 23% to 27% magnesia, 21% to 25% alumina, up to 5% lime, up to 3% iron oxide (calculated as FeO) up to 3% chromic oxide ($Cr_2O_3$), the remainder silica and incidental impurities.

The composition of the invention is made simply by intermixing the desired quantities of the ferroalloys with previously prepared slag-forming constituent. The slag-forming constituent may be prepared in conventional manner as by fusing the individual ingredients, casting the fused product onto chills and comminuting it to desired size.

During use of the welding composition of the invention the chromium and manganese from the composition are transferred during the welding process from the melt to the deposit on the surface of the base metal. The chromium provides a wear-resistant, hard surface, and the manganese, too, serves to increase hardness of the deposit as well as to impart toughness to it. By varying the percentage of ferrochromium in the welding composition, the hardness of the deposited metal may be varied, and experience has shown that a desired hardness may be achieved by incorporation of a particular proportion of ferrochromium in the composition. For instance, it has been established experimentally that the inclusion of approximately 8% ferrochromium containing 67% chromium in a composition in the ranges defined above produces a hardness in the range of 30–40 Rockwell C when used with a carbon steel electrode. When the ferrochromium content of the composition is 10%, the hardness ranges from 40–50 Rockwell C. Rockwell C hardnesses in the range 50–60 result when the composition contains 12% ferrochromium. All of these values have reference to the use of a composition containing about 3% ferromanganese containing 79% manganese.

The tests just described were conducted in accordance with conventional welding technique utilizing a welding current (D. C.) of 400 amperes, at 28 volts with a bare carbon steel electrode containing not more than 0.1% carbon. A one inch deep layer of the composition of the invention was provided at the welding zone, and welding speed was three inches per minute. The welding head was oscillated at the rate of 18 oscillations per minute with a sweep of 1⅞ inches to produce a wide layer of deposited metal.

The following detailed results of these experiments are set forth as indicative of the operation of the invention. With a composition containing 8% high carbon ferrochromium, 3% high carbon ferromanganese, 7% fluorspar, and 82% slag-forming material containing 43%–47% silica, 23%–27% magnesia, 21%–25% alumina and 3% maximum each of iron oxide (FeO) and chromic oxide ($Cr_2O_3$) a deposit having a Rockwell C hardness of 38 was produced. The weld metal contained 0.38% carbon, 0.52% manganese, 0.65% silicon, 1.69% chromium.

In another instance, all conditions being the same except that 10% high carbon ferrochromium was utilized and the slag-forming material represented 80% of the composition, the weld metal had a Rockwell C hardness of 44 and contained 0.43% carbon, 0.67% manganese, 0.70% silicon and 2.05% chromium. In a third instance the ferrochromium content was increased to 12% and the slag-forming material reduced to 78%, all other conditions being the same as in the first instance. The deposited metal produced had a Rockwell C hardness of 51 and contained 0.49% carbon, 0.74% manganese, 0.63% silicon and 2.79% chromium.

It will be observed that in the examples referred to, high carbon ferrochromium was used. It is possible to utilize low carbon ferrochromium instead, but ordinarily high carbon ferrochromium would be preferred because it is cheaper and tends to produce a harder deposit. In one instance using a composition identical with that in the third instance reported above except that 12% low carbon ferrochromium was used instead of 12% high carbon ferrochromium, the following results were obtained. The deposited metal had a Rockwell C hardness of 40 and contained 0.27% carbon, 0.62% manganese, 0.66% silicon and 1.58% chromium.

By reason of the ability to produce desired hardnesses utilizing the welding composition of the invention and modifying it only by the proportion of chromium included therein the invention offers advantages in eliminating the necessity for stocking a variety of welding electrodes of different compositions. Although its use has been discussed with particular reference to carbon steel electrodes, of course the composition may be used with alloy steel electrodes as well.

I claim:

1. A welding composition containing 8% to 12% ferrochromium, 2% to 4% ferromanganese, up to 8% fluorspar, the remainder slag-forming constituents, said slag-forming constituents comprising 23% to 27% magnesia, 21% to 25% alumina, up to 5% lime, up to 3% iron oxide (calculated as FeO), up to 3% chromic oxide ($Cr_2O_3$), the remainder silica and incidental impurities.

2. A welding composition as defined by claim 1 in which the ferromanganese content is approximately 3% and at least about 6% fluorspar is present.

References Cited in the file of this patent
UNITED STATES PATENTS

| | | |
|---|---|---|
| 2,191,471 | Hopkins | Feb. 27, 1940 |
| 2,427,350 | Carpenter et al. | Sept. 16, 1947 |